United States Patent [19]
Overocker

[11] Patent Number: 5,236,059
[45] Date of Patent: Aug. 17, 1993

[54] STEERING MECHANISM FOR TRACTORS OR SIMILAR VEHICLES

[76] Inventor: Lyle E. Overocker, R.R. 1, Milford, Iowa 51351

[21] Appl. No.: 849,585

[22] Filed: Mar. 11, 1992

[51] Int. Cl.⁵ .............................................. B62D 61/12
[52] U.S. Cl. .................. 180/209; 180/906; 280/772
[58] Field of Search .............. 180/209, 906, 161; 280/772, 103

[56] References Cited

U.S. PATENT DOCUMENTS 1,326,397 12/1919 Farmun .
2,788,858 4/1957 Aasland et al. ........................ 180/25
4,109,747 8/1978 Hornagold et al. ................. 180/140
4,630,701 12/1986 Venetejoki ............................ 180/209
4,986,386 1/1991 Iwamoto et al. ..................... 180/906

Primary Examiner—Jesùs D. Sotelo

[57] ABSTRACT

A novel front axle construction for tractors and similar vehicles to provide a short radius turning capacity. The axle is constructed so that it can be extended laterally of the tractor so that steered wheels can be turned more sharply than normal without interfering with the body of the tractor. Control mechanism is provided to cause the axle to be extended and retracted selectively as needed.

6 Claims, 3 Drawing Sheets

STEERING MECHANISM FOR TRACTORS OR SIMILAR VEHICLES

BACKGROUND AND SUMMARY OF THE INVENTION

This invention pertains to tractors, especially farm tractors where a relatively short radius turn may be desirable in field use. It also may be used on any other vehicle in which a short turning radius is required.

Farm tractors are almost universally used not only for planting farm fields, but also for cultivating and often for harvesting crops. Particularly in the growing of row crops such as corn, cotton, and soy beans, the tractor, upon reaching the end of a row, is expected to make a relatively short-radius turn so that other parallel rows may then be followed. The parallel row may not necessarily be immediately adjacent the completed row, but is preferably not very remote. Further, the arc at the end of the row should be kept to a reasonably short radius so that the width of the crossing rows at the end of field is kept small thus keeping the wasted space to a minimum.

There are other vehicles, such as fork lift devices, which also require a short turning radius because of narrow aisles in warehouses. The mechanism proposed here may also be useful for such devices.

The turning radius for many present farm tractors, especially the large front wheel drive tractors having large traction wheels, is limited because of the space between the steered wheels and the body of the tractor. As the steered wheel is turned, the tire approaches contact with the body of the tractor. Stops then prevent further turning to avoid interference between the wheel and the tractor body. To avoid this problem, the present invention provides for extension of the axles when the steering gets to the sharpest turn.

DESCRIPTION

Briefly my invention comprises a steering device to allow sharper turns by a tractor or similar device by automatically extending the front axle to move the centers of the steered wheels outward in very sharp turns.

More specifically, the device is designed for use with a tractor having an enclosed front end shown diagrammatically at 10. Applicant will describe the device as used in connection with farm tractors. However, it will be recognized that where tractors are written about, other similar vehicles are included. A fixed front axle 11 forms a part of the frame of the tractor to support the front end 10. A pair of front wheels 12 is mounted on steering knuckles 13 of any preferred style. Those steering knuckles allow the wheels 12 to be turned at an angle to the path of the tractor and thus to steer the tractor.

Figure 3:
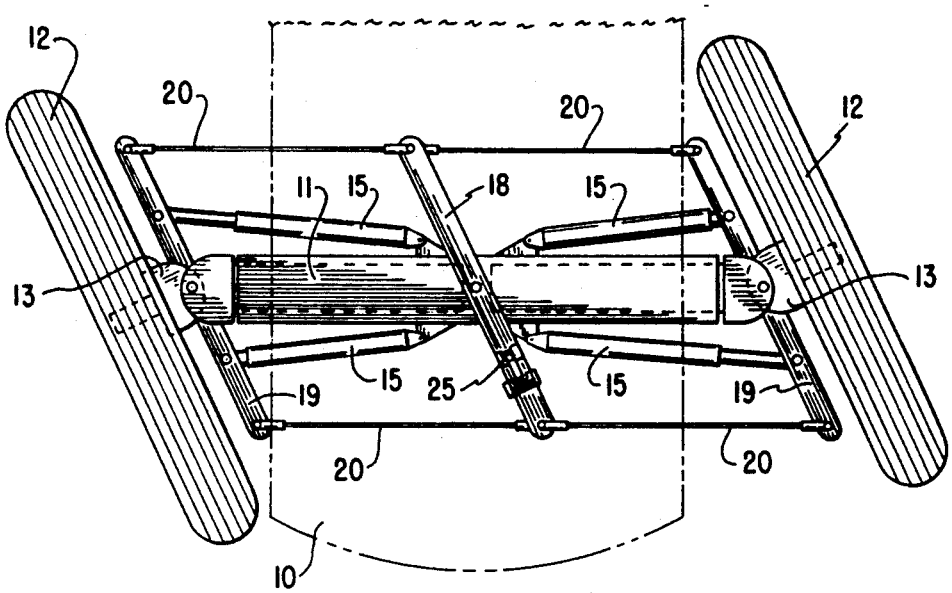
FIG. 3 is a view similar to FIG. 1 showing the apparatus in a normal left turn.

In my preferred device, the position of the wheels is controlled by a set of four hydraulic piston/cylinder assemblies 15. These are arranged as matched opposite pairs. Thus, the right front assembly and the left rear assembly are one pair and the remaining two assemblies (left front and right rear) form the opposite pair. As shown in FIG. 3, in a normal turn, one pair of assemblies will be extended and the other retracted. Thus in the left turn illustrated, the right rear/left front pair is extended and the other two are retracted.

Figure 1:
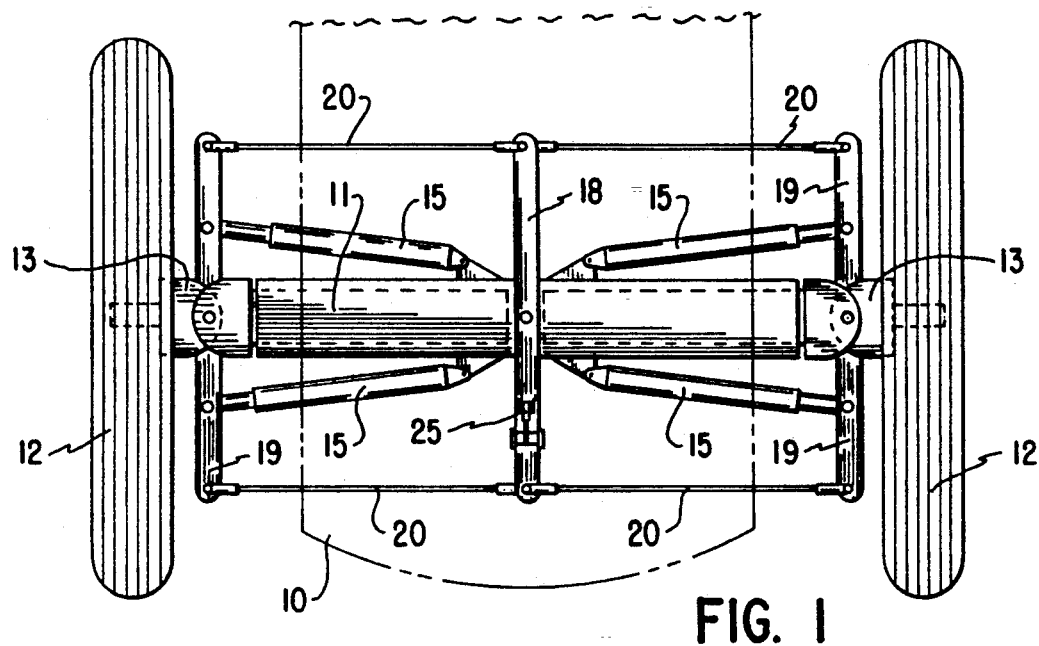
FIG. 1 is a diagrammatic top plan view of the front end of a tractor with the novel steering apparatus in place and arranged for normal forward driving.
Figure 2:
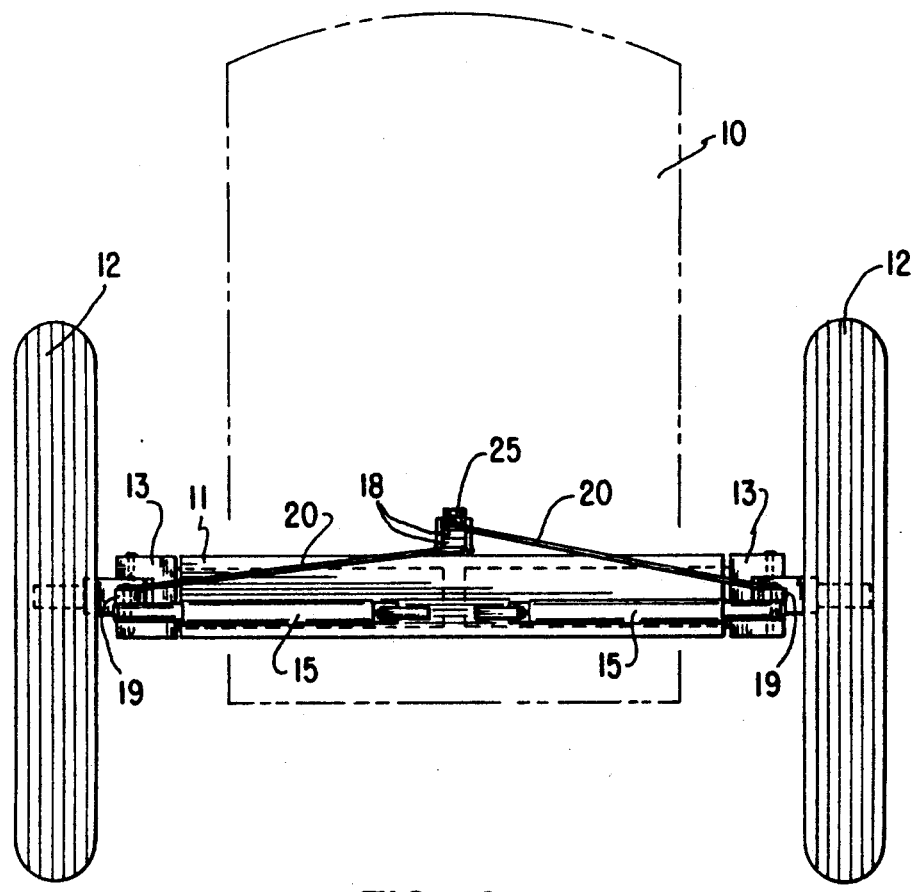
FIG. 2 is a front elevational view similar to FIG. 1.

A pair of control levers 18 is pivoted at their center to the axle 11. The ends of the levers 18 are attached to a steering bar 19 by links 20. The steering bars are fixed to the knuckles 13 so that the wheels 12 can be steered, and the hydraulic assemblies are also pivoted to the bars 19 for the purpose of steering the wheel 12. In normal travel as shown in FIGS. 1 and 3, the bar 19, levers 18 and links 20 form a parallelogram linkage on each side of the center of the tractor so that wheel 12 can be kept in proper alignment.

As illustrated in FIG. 3, in a normal turn, the wheels 12 approach very close to the front end 10 so that the angle of the turn of the wheel is limited. This also limits the sharpness of turn of the tractor.

Figure 4:
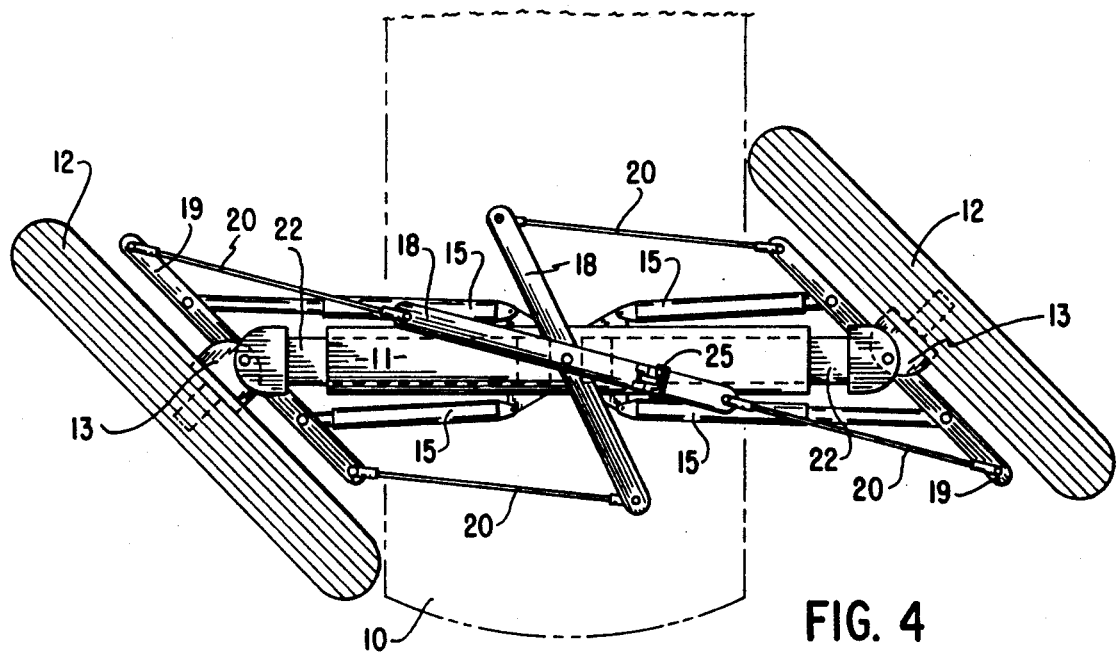
FIG. 4 is a view similar to FIG. 3 showing the apparatus in a sharp left turn.

In order to provide for additional turning of the wheels, the axles are made extendable as shown in FIG. 4. This may be accomplished by providing sliding extensions 22 telescopingly slidable within the fixed axle 11. To prevent rotation the extension 22 within the fixed axle 11, the axles may have a cross section in the shape of a square or other flat sided figure. Preferably, however, the two parts are formed with complementary splines to provide relatively easy sliding.

The sliding process is actuated by the hydraulic assemblies 15. As noted, there are two levers 18. The links connecting one end of the levers to the steering bars 19 are also matched in opposite pairs as are the hydraulic assemblies. Thus, the right front and left rear links form one pair and are connected to the front of the right hand steering bar and the left rear end respectively. This arrangement is clearly shown in FIG. 4.

In normal travel (FIGS. 1 and 3) the two levers 18 are held in strict parallel relationship by a latch mechanism 25 described in more detail later. This latch simply holds the two levers 18 together and thus keeps the steering mechanism in the unused arrangement for normal steering and for normal travel. However as the tractor nears the end rows, or when for any reason, a tighter turn is needed, the latch is arranged to release each lever to turn independently. Therefore, before the axles are extended, the levers 18 are released, and the extension of one opposing pair of hydraulic assemblies 15 simply presses the corresponding ends of the steering bars 19 to pull the extensions 22 slidably out of the fixed axle. This extended position is shown in FIG. 4. It will be noted that as one opposing pair of assemblies 15 is extended, the complementary pair retains its retracted position, and is not further retracted.

As the turn is completed, the retracted pair of assemblies 15 holds to its retracted position while the extended pair is gradually retracted pulling the extension 22 back into the fixed axle 11. When that position is achieved, the levers 18 are again parallel so that the latch 25 is again engaged and normal steering again takes place.

Figure 6:
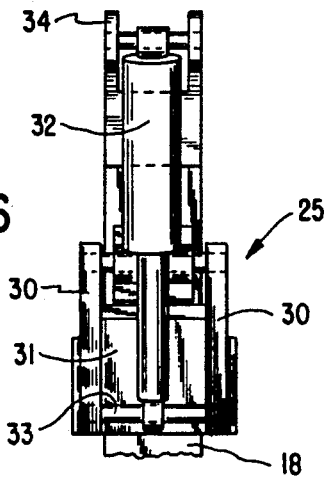
FIG. 6 is a top view of the device shown in FIG. 5.
Figure 5:
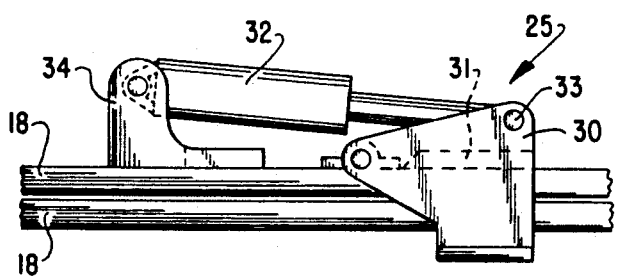
FIG. 5 is a detailed side elevational view of a latch usable to control the relation of the two control levers of the apparatus.
Figure 7:
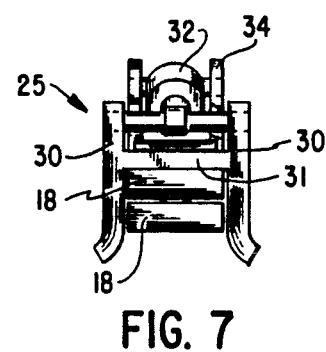
FIG. 7 is an end elevational view of the device of FIG. 6.

A latch 25 of possible construction is shown in FIGS. 5-8. As illustrated, the latch 25 consists of a pair of end plates 30 pivotally mounted on the upper of the two levers 18. The plates are spaced apart so as to closely bracket its two levers 18 and to hold them in parallel relation as shown in FIGS. 5-7. A stop plate 31 welded between the end plates 30 will hold them in this parallel relationship and also provides a limit to the downward travel by its engagement with the upper lever 18 when the levers are latched.

Figure 8:
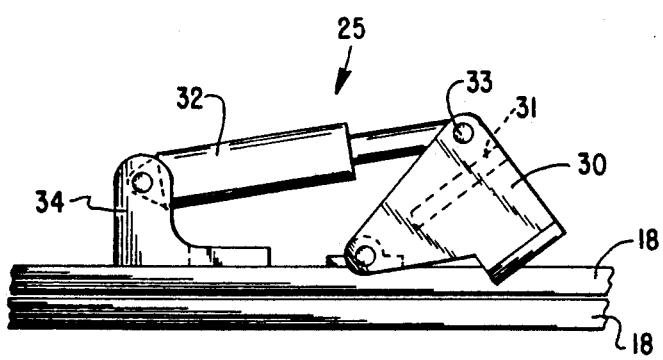
FIG. 8 is a view similar to FIG. 6 showing the latch in a released position.

To release the levers 18 from the latched engagement, the plates are pivotally moved upward to the position shown in FIG. 8 by means of a small hydraulic piston/cylinder device 32 engaged between a bar 33 engaged between the plates 30 and a bracket 34 which is mounted on the lever 18 adjacent the pivoted mounting of the plate 30. By the use of electrical sensing device, well known in the art, the point at which the maximum normal turn is reached can be sensed automatically. For example, the full withdrawal of the diagonally opposite hydraulic assemblies on the sides where the wheel 12 opposed the body 10 can be the actuating instance. Alternatively the maximum normal turn of the turning part of the knuckles 13 could be used. In either case, the sensing of the maximum normal turn would trigger the withdrawal of the hydraulic means 32 so as to raise the latch 30 to disengage the two levers 18 and to allow further movement of one of them as the extended hydraulic assembly 15 pushed the wheel to turn further because of the extending axle.

In retraction, the withdrawn assemblies 15 would be held as the extended assemblies 15 are collapsed. As the normal turn is reached and the axle 22 fully withdrawn, the piston/cylinder 32 again extends to drop the latch 30 and again the levers are held together for normal steering.

By these means it becomes possible to steer a regular farm tractor in a steering radius substantially smaller than normal and thus to diminish the necessary space for turning at the ends of the row of rows of crop planting.

I claim as my invention:

1. In combination with a tractor, or similar powered traction machinery, having an enclosed front end, and steerable wheels pivotally mounted on a front axle adjacent said front end, said wheels being steerable within a normal range, the limits of which are measured by the limits at which said wheels approach interference with said front end, means to allow steering beyond said normal range comprising extensions slidably engaged with each end of said axle adapted to be slidably extended from said axle, said wheels being pivotally mounted on said extensions, control means engaged with each said wheel to control the pivoted position thereof, said control means being interconnected so that said wheels are always in place substantially parallel to each other, said control means including releasable means to hold said wheels in normal relative positions during said normal range of movement, said releasable means being releasable to allow said extensions to be slidable outwardly of said front end, and means connected to said releasable means to sense said limits of said normal range to cause the release of said releasable means.

2. The combination of claim 1 in which said control means includes similar linkages for each wheel, said linkages including levers centrally pivoted and lying adjacent each other, said control means including latch means adapted to hold said levers releasably adjacent each other, and means engaging said latch means to release the holding of said levers.

3. Steering mechanism for a farm tractor or similar powered traction machinery, said tractor having steered wheels mounted on an axle; said mechanism comprising extensions slidably engaged with each end of said axle, one of said wheels being pivotally mounted on each of said extensions for steering, means engaged between said wheels adapted to move said wheels pivotally for steering, said means engaged between said wheels being also adapted to cause said extensions to slide outwardly as the normal maximum angle of turn is passed and to cause said extension to retract as said normal maximum angle is returned to after being passed, and hydraulic means, comprising a plurality of hydraulic cylinders engaged between said axle and said means engaged between said wheels, said hydraulic means being simultaneously controllable both to cause said wheels to be moved pivotally for steering and also to cause said extensions to slide outwardly and subsequently to be retracted.

4. Steering mechanism for a farm tractor or similar powered traction machinery, said tractor having steered wheels mounted on an axle; said mechanism comprising extensions slidably engaged with each end of said axle, one of said wheels being pivotally mounted on each of said extensions for steering, means engaged between said wheels including steering bars directly connected to said wheels and linkages engaged with said bars, hydraulic means engaged between said axle and said bars, said hydraulic means being controllable to cause said wheels to be moved pivotally for steering, and to cause said extensions to slide outwardly as the normal angle of turn is passed and subsequently to be retracted.

5. The mechanism of claim 4 in which there are two wheels, one at each end of said axle, each wheel having one steering bar and one linkage associated with it, each linkage including a lever, said levers for opposite wheels being adapted to be positioned adjacent each other for normal steering and to be divergent for beyond-normal steering, and latch means adapted to hold said levers in their adjacent positions for normal steering but to release said levers when desired for beyond-normal steering.

6. The mechanism of claim 5 in which means attached to said latch means causes release of said latch means as said levers approach a position for beyond-normal steering.

* * * * *